(No Model.) 2 Sheets—Sheet 1.
E. B. BARKER.
PHOTOGRAPHIC CAMERA BOX.
No. 272,622. Patented Feb. 20, 1883.
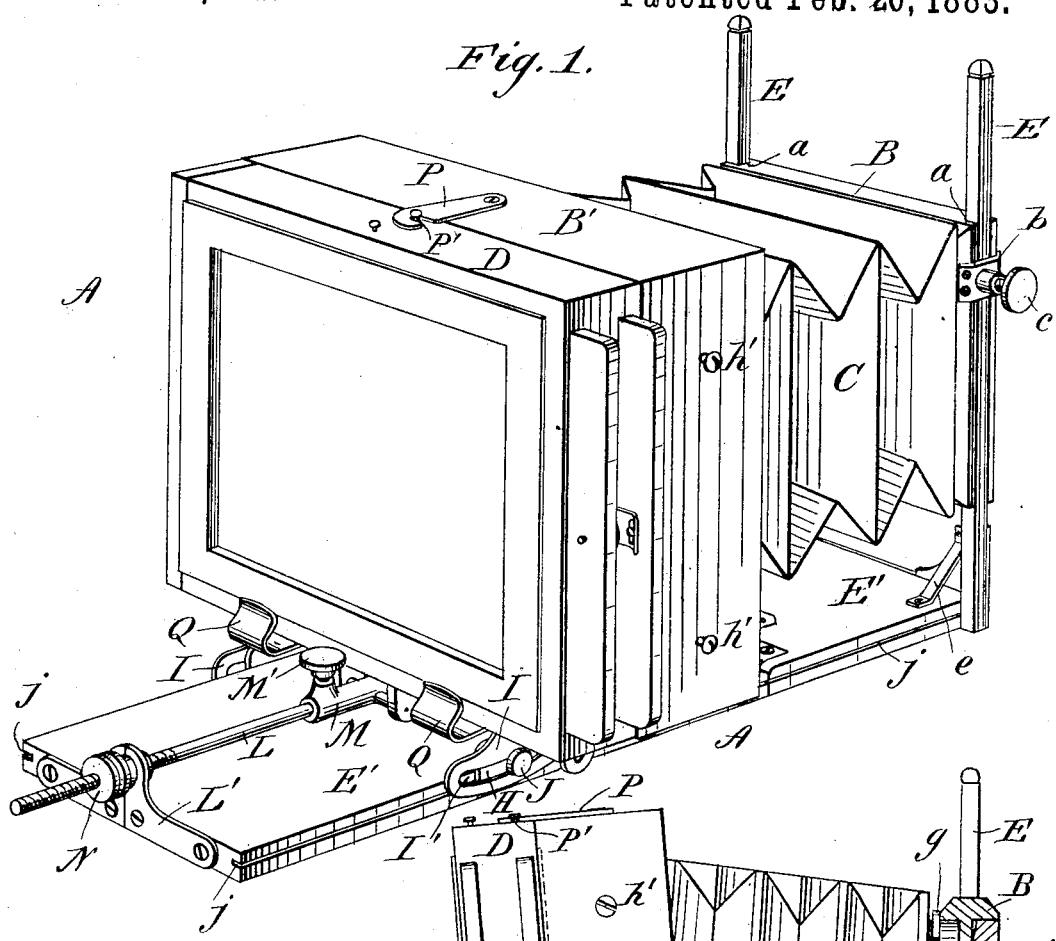
Fig. 1.
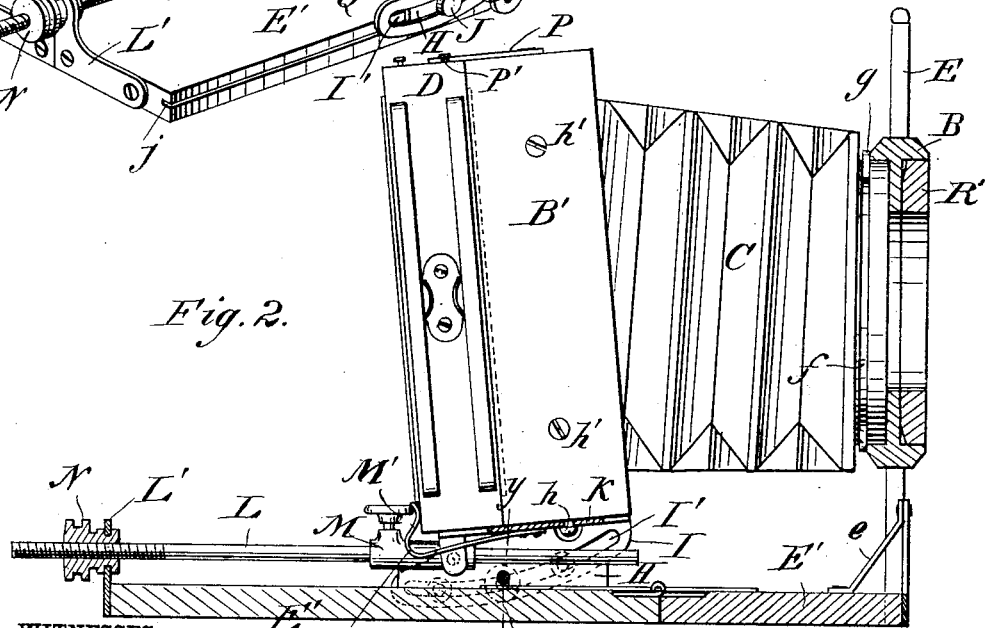
Fig. 2.
Fig. 7.
WITNESSES:
Donn Twitchell.
C. Sedgwick
INVENTOR:
E. B. Barker
BY
Munn & Co.
ATTORNEYS.

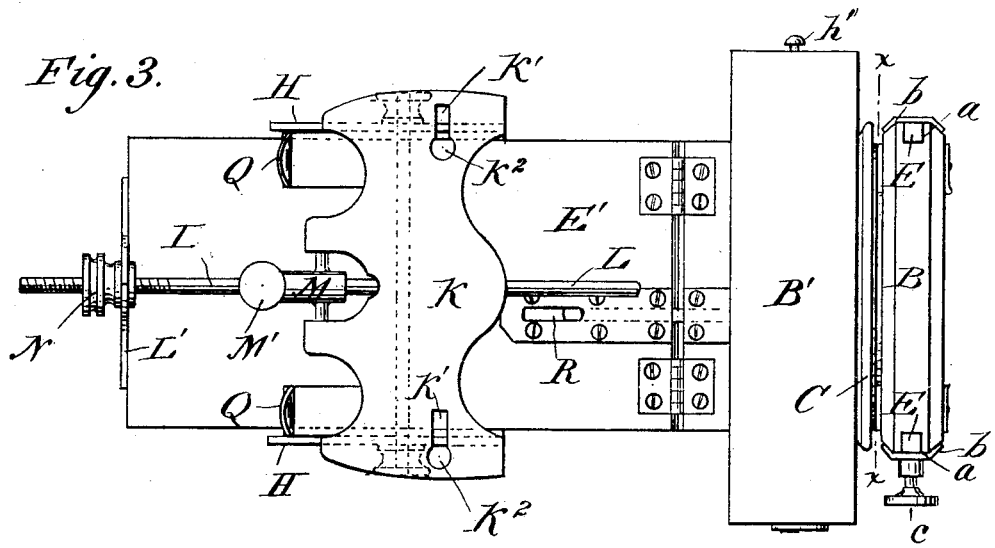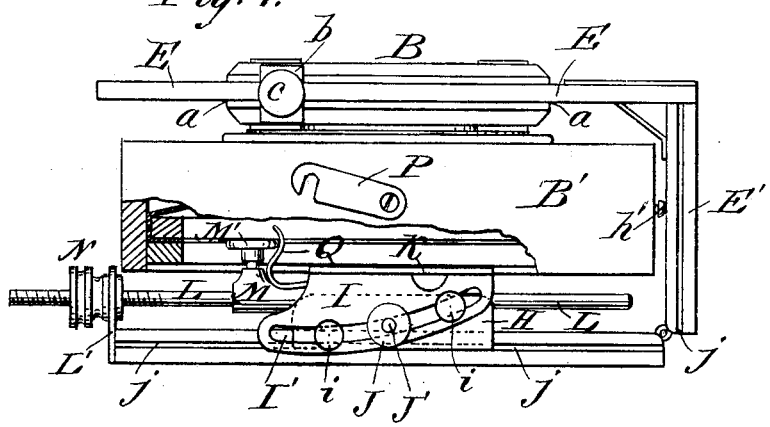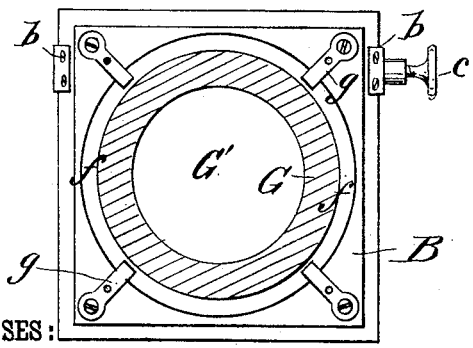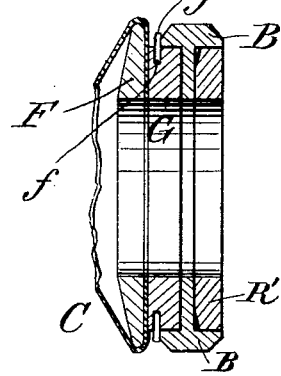

UNITED STATES PATENT OFFICE.

ERASTUS B. BARKER, OF NEW YORK, N. Y., ASSIGNOR TO E. & H. T. ANTHONY & CO., OF SAME PLACE.

PHOTOGRAPHIC CAMERA-BOX.

SPECIFICATION forming part of Letters Patent No. 272,622, dated February 20, 1883.

Application filed December 6, 1882. (No model.)

*To all whom it may concern:*

Be it known that I, ERASTUS B. BARKER, of the city, county, and State of New York, have invented a new and Improved Photographic Camera-Box, of which the following is a full, clear, and exact description.

The object of my invention is to facilitate the changing and adjustment of the camera-box for taking either horizontal or vertical pictures.

A further object of my invention is to facilitate the adjustment of the front or lens frame of the camera; also, to facilitate the giving of a swing-back movement to the rear portion of the camera.

A further object of my invention is to facilitate the setting and holding of the plate-holder to the back of the camera-box.

The invention consists in so attaching a bellows to the front part of a camera as to allow the bellows to turn or revolve, whereby only the rear part of the camera need be loosened to change the position from vertical to horizontal, or vice versa, without altering the position of the front part of the camera, to which the lens is attached.

The invention further consists in a carriage or running-gear, or support for the rear part of the camera, the same being so arranged by curved slots and pins or screws that the rear part of the camera can be inclined as desired, forming what is termed a "swing-back."

The invention further consists in devices for adjusting the front end of the camera-box vertically according to the inclination of the rear section.

The invention further consists in clamp-hooks for holding the lower part of the shield or plate-holder on the rear part of the camera-box.

The invention also consists in various parts and details and combinations of the same, as will be fully set forth and described hereinafter.

Reference is to be had to the accompanying drawings, forming part of this specification, in which similar letters of reference indicate corresponding parts in all the figures.

Figure 1 is a perspective view of my improved camera-box, showing the same adjusted for taking horizontal pictures. Fig. 2 is a longitudinal elevation of the same, showing it adjusted for taking horizontal pictures, the rear part of the camera being in a swing-back position. Fig. 3 is a plan view of the camera-box and sliding support, showing the rear part of the box detached from its sliding support. Fig. 4 is a longitudinal elevation of the camera-box, showing the same folded, parts being broken out and others shown in section. Fig. 5 is a cross-sectional elevation of the front end of the camera on the line $x\,x$, Fig. 3. Fig. 6 is a cross-sectional elevation of the same. Fig. 7 is a cross-sectional elevation of the under frame and the swing back support for the rear section of the camera on the line $y\,y$, Fig. 2.

The camera-box A is made in two sections, the front section or lens-frame, B, and the rear section, B′, which are connected by the bellows C, and to the rear camera-box section, B′, a suitable plate-holder, D, is held. The front section or lens-frame, B, is provided in its side edges with grooves $a$ for receiving standards E on the front end of the under frame, E′, which standards E are suitably braced and stiffened by braces $e$. Clips $b$ serve to hold the grooved edges of the lens-frame B between the standards E, and one of the clips is provided with a binding-screw, $c$, or other locking device for locking the lens-frame B at any desired height on the standards E. The front end of the bellows C is attached to an apertured plate, F, which is attached to an annular apertured plate, G, in the edge of which an annular groove, $f$, is formed. This annular plate G passes into the rear annular recess of the front section or lens-frame, B, in which annular recess it is held by swinging clips $g$, attached to the rear surface of the section B, the front ends of said clips passing into the grooves $f$, formed in the plate G. The block formed by the united plates F G turns or oscillates in the rear surface of the lens-frame B of the camera-box, and thus permits of the revolving or oscillating of the bellows in its longitudinal axis without detaching the bellows from the front section or lens-frame of the camera-box.

Instead of the grooved plate G for attaching the bellows to the lens-frame B and permitting the oscillating or revolving motion described, I may use any other suitable device which answers for the same purpose.

The rear section, B', of the camera-box is provided on one longitudinal side with two screws or headed studs, h, and on one end with two like screws or headed studs, h', which are placed the same distance apart as the studs h, and the same distances from the center of the end as the studs h are placed in relation to the center of the longitudinal side.

The under frame, E', is provided on each longitudinal edge with a horizontal longitudinal groove, j, and into each groove the horizontal flange of an angle-plate, H, is passed to slide in the said groove.

To the outer surface of the vertical flange of each angle-plate H a plate, I, provided with a segmental slot, I', is held by studs i, passing through the said slot into the vertical flange of the angle-plate H. A binding-nut, J, is mounted on a screw-pintle, J', projecting from the vertical flange of the angle-plate H, through the slot I' of the plate I, and by means of the said binding-nut J the plate I can be locked in the desired position on the vertical flange of the plate H. The two slotted plates I are connected by a flat horizontal table-piece, K, which extends across the upper surface of the under frame, E', and is provided with two slots, K', extending in the direction of the width of the under frame and terminating at corresponding ends in enlargements $K^2$. The corresponding ends of the slots K' must be the same distance apart as the studs h or h' on the rear section, B', of the camera-box. A rod, L, passes through a guide-clip, L', on the rear end of the under frame, E', and through a sleeve, M, pivoted on the under side of the transverse plates K, which sleeve M is provived with a binding-screw, M', for holding the rod L fixed in the sleeve M. The rear end of the rod L is screw-threaded, and on the said threaded end is mounted a nut, N, which is held to turn on its longitudinal axis in the clip L', whereby if the sleeve M is locked on the rod L the plate K and the angle-plates H can be moved longitudinally for focusing the camera by turning the nut N. Any other suitable well-known device can be used for focusing the camera. The rear section, B', of the camera-box rests on the plate K, and is held on the same in the manner that will be described hereinafter.

The plate-holder D, which is placed against the rear of the section B', is held at its upper end to the section B' by a hook, P, and stud or pin, P', in the well-known manner, and at the bottom it is held to the section B' by hook-clamp springs Q, attached to the plate K or to the running-gear of the camera. Heretofore dowel-pins have been used to hold the bottom of the plate-holder to the camera-box; but as the supporting-plate K or other running-gear is adjustable and movable it cannot be provided with dowel-pins, and I have provided the springs Q.

As shown in the drawings, the camera is arranged for taking horizontal pictures—that is, pictures of which the horizontal axis is longer than the vertical axis. Then the studs h on the longitudinal side of the rear section, B', are in the slots K' of the plate K. If it is desired to change the position of the camera-box, so as to take vertical pictures—that is, pictures in which the vertical axis is longer than the horizontal axis—the rear section, B', of the camera-box is moved in the direction toward the enlarged ends $K^2$ of the slots K', to permit of withdrawing the headed studs h, through the enlargements $K^2$, from the plate K. Then the rear section, B', of the camera-box is raised and turned ninety degrees, the block F G turning on the rear surface of the lens-frame B, so that the longitudinal axis of the rear section, B', will be vertical. The headed studs h' on the end of the section or lens-frame B are then passed through the enlarged ends $K^2$ of the slots K', and the rear section, B', is moved in the direction from the enlarged ends of the slots K toward the other ends, whereby the studs h' pass into the slots K', and the rear section, B', to which the studs are attached, will be held on the plate K. The position of the front section or lens-frame, B, is not changed. If pictures of very large buildings or other high objects are taken, the vertical lines of the same will not show vertical in the picture unless the rear section of the camera is swung back, and for this purpose the swing-back camera is provided. To swing back the section B' the screws J' and M' are loosened, and then the section B' can be inclined more or less, the curved slots I guiding the rear section, B', during these movements. After the desired inclination of the rear section, B', has been obtained the nut J' and the screw M' are drawn up tightly. Whenever the inclination of the rear section, B', is adjusted, the height of the front section, B, is to be adjusted accordingly. When the rear section, B', is swung back or placed in a backward inclined position, as shown in Fig. 2, then the lens-frame B will be raised between standards E. When section B' is inclined in the contrary direction, then section B will be lowered. The under frame, E', is composed of two sections, which are hinged to each other, and which can be locked in position by means of a sliding bolt, R. By making the under frame, E', hinged the camera-box and its under frame can be folded very compactly, as shown in Fig. 4.

The lens-tube to be used in this camera is to be attached in the ordinary manner to the usual tube-receiving disk, R,' that is carried in the front section, B.

Having thus fully described my invention, I claim as new and desire to secure by Letters Patent—

1. A photographic camera-box made substantially as herein shown and described, with the front of the bellows attached to the lens-frame by an oscillating or revolving joint, as set forth, whereby the camera may be readily reversed for taking either vertical or lateral pictures, as desired, without moving the lens-frame.

2. In a photographic camera, the combination of the revolving block F G with the standards E, lens-frame carrier B, and bellows C, substantially as herein shown and described.

3. In a photographic camera, the revolving block F G, constructed with a groove, $f$, to receive the clips $g$, substantially as herein shown and described.

4. In a photographic camera, the independent standards, made open at their tops and attached to the under frame, E', and adapted to hold and guide the sliding lens-frame B and permit instant removal of the lens-frame from between them, substantially as herein shown and described.

5. In a photographic camera, the combination, with the under frame, E', and the sliding lens-frame B, of the independent standards E, substantially as shown and described, whereby the lens-frame may be conveniently removed from or replaced between the standards, as set forth.

6. In a photographic camera, the supporting-plate I K, provided with curved slots I', and adapted for attachment to the under side of the camera-box and to the under frame or running-gear, substantially as herein shown and described, whereby the usual swing-back positions may be given to the camera, as set forth.

7. The combination, with the camera-box and its under frame, of the slotted supporting-plate I K, operated as herein described and set forth.

8. In a photographic camera, the combination, with the rear section of the camera-box, and with the under frame or running-gear thereof, of oscillating supports, substantially as shown and described, to form a swing-back for the camera, as set forth.

9. In a photographic camera, the combination, with the sliding plates H, under frame, E', and rear camera-section, B', of the oscillating supports I K, substantially as herein shown and described.

10. The combination, with the plate K and the camera-box A, of the headed studs or pins $h\ h'$ and the slots K', substantially as herein shown and described, whereby the camera may be quickly detached, revolved, and fastened upon the said plate, as set forth.

11. In a photographic camera, the springs Q for holding the shield or plate-holder in position, said springs being attached to the running-gear or plate of the camera, substantially as herein shown and described, and for the purpose set forth.

12. The combination, with the camera A and the plate K or running-gear, of the springs Q, substantially as herein shown and described, and for the purpose set forth.

ERASTUS B. BARKER.

Witnesses:
 EDGAR TATE,
 EDWD. M. CLARK.